R. S. BRYANT.
RIM FOR VEHICLE WHEELS.
APPLICATION FILED MAR. 4, 1914.
1,301,097.
Patented Apr. 22, 1919.
2 SHEETS—SHEET 1.
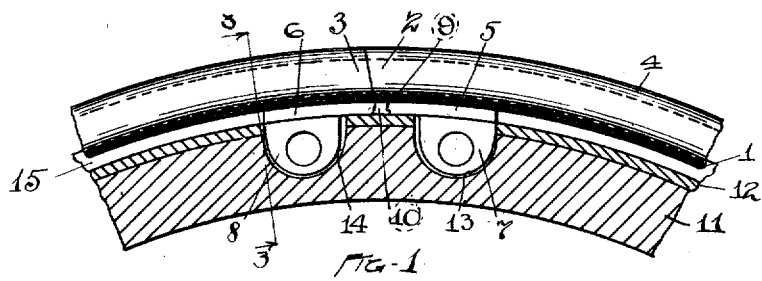
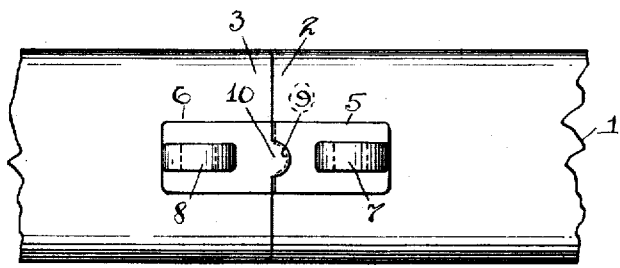
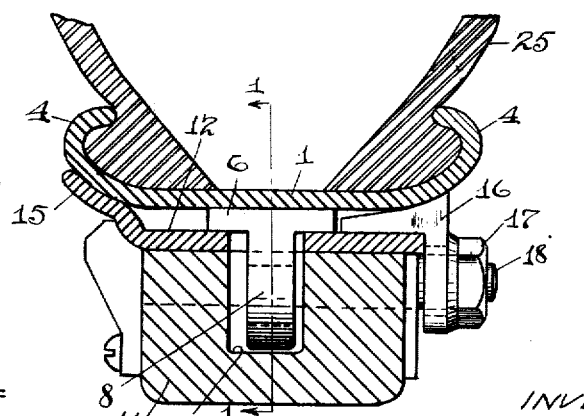
WITNESSES
O. M. Kappler
H. B. Fay
INVENTOR
Richard S. Bryant
BY Fay and Oberlin
ATTORNEYS

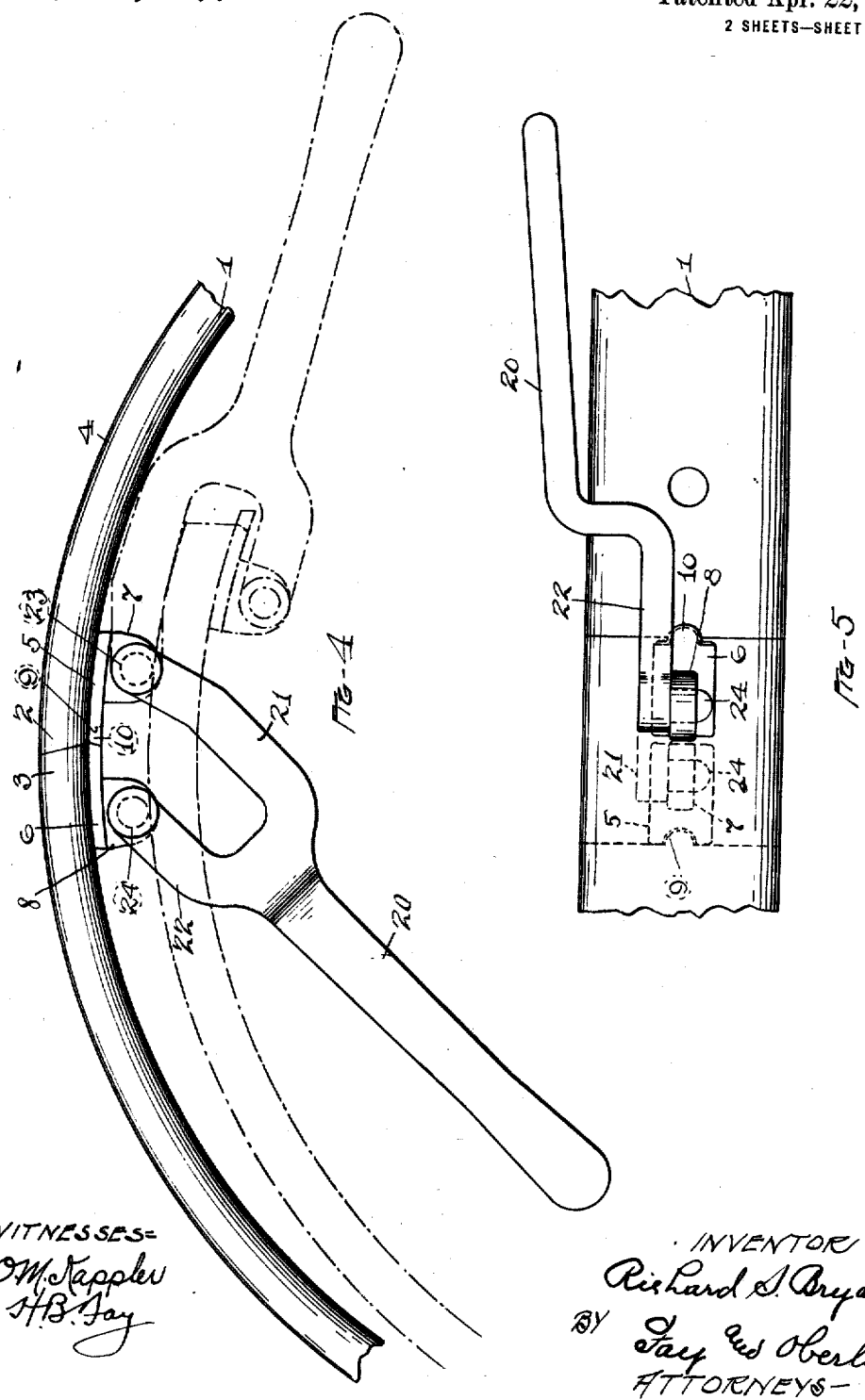

UNITED STATES PATENT OFFICE.

RICHARD S. BRYANT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

RIM FOR VEHICLE-WHEELS.

1,301,097.   Specification of Letters Patent.   Patented Apr. 22, 1919.

Application filed March 4, 1914. Serial No. 822,297.

*To all whom it may concern:*

Be it known that I, RICHARD S. BRYANT, a citizen of the United States, and a resident of Cleveland, county of Cuyahoga, and State of Ohio, have invented a new and useful Improvement in Rims for Vehicle-Wheels, of which the following is a specification, the principle of the invention being herein explained and the best mode in which I have contemplated applying that principle, so as to distinguish it from other inventions.

The present improvements have particular regard to that type of demountable tire-supporting rim, wherein provision is made for the placing of the tire on, and its removal from the rim, by transversely splitting the latter so as to permit of contraction of such rim to less than normal diameter. This construction permits of the use of integral flanges for retaining the tire on the rim in place of the detachable flanges, one or more of which are otherwise necessary for use with modern, double-tube, pneumatic tires, the outer tube or "shoe" of which has relatively inextensible edges. The object of the present invention is to provide a "split" rim of the type just referred to, wherein the ends may be readily separated and contracted, one past the other, by means of a simple implement or tool, forming a feature of the invention; a further object is to provide superior locking means for securing the ends in proper alinement when the rim is in position on the wheel body. To the accomplishment of the foregoing and related objects, the invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—

Figure 1 is a broken side elevational view of my improved rim in place on the wheel body, the latter being sectioned to more clearly show the construction of the rim; Fig. 2 is a bottom plan view of such rim as it appears when its ends are in alinement; Fig. 3 is a transverse sectional view of the rim and wheel body; Fig. 4 is a side elevational view of the rim removed from the wheel body and with the operating tool or device attached thereto, the effect of the latter's operation on the rim being illustrated in dotted outline; Fig. 5 is a bottom view of the rim corresponding with the position of the latter shown in dotted outline in Fig. 4.

As usual in rims of the type in hand, the base of my improved rim consists, in effect, of a discontinuous band or annulus 1, having its respective ends 2 and 3 of complementary form and normally held in contact by the resiliency of the band. As illustrated (see Fig. 3), the band is shown as having incurved side-flanges 4, such as are adapted for the reception of clencher tires, but this is a matter of indifference, since such flanges may just as readily be formed to receive straight-sided tires. The abutting ends 2 and 3 of the rim are beveled, that is, cut on a plane angularly related to a radius of the rim, so that such ends may be more readily moved past each other, as will presently be described, incidentally to contracting the rim.

Welded, or otherwise fixedly attached to the under side of the rim, adjacent such ends 2 and 3, are two plates 5 and 6 formed with similar, radially inwardly extending lugs or ears 7 and 8, that are transversely perforated, as shown in Fig. 1. The one plate has its under end formed with an undercut recess 9, and the other lug is provided with a complementary projection, or tongue 10, adapted to engage such recess. The meeting ends of the plates, aside from such recess and tongue portions, are beveled at an angle oppositely inclined from that of the bevel on which the ends of the rim proper are cut, while the tongue and recess portions in question are preferably cut on an angle similar to that on which the ends of the rim proper are cut.

Of the wheel body, upon which the rim is demountably secured, only a portion of the felly 11 and the corresponding section of the felly-band 12 are shown in the drawings (Figs. 1 and 3). Such felly-band and felly are provided with two recesses 13 and 14, located midway of their sides, as shown in such Fig. 1, these notches being peripherally spaced just the proper distance apart to receive the two lugs 7 and 8 respectively, on the plates attached to the ends of the rim. Such recesses 13 and 14 are a trifle longer than the lugs and the latter are beveled or rounded on the outer edges so that, as they are forced into the recesses, the tendency is to force the ends of the rim together, if they are not already in close contact. These lugs serve the further function of driving-lugs, the thickness of the plates 5 and 6 being gaged to just fill the space between the felly-band and rim and thus support the ends of the latter, such rim being secured against lateral displacement on such wheel body by means of a fixed shoulder or flange 15 on the one side of the felly band 12, and by means of a wedge ring or wedging clips 16 on the other side, which may be drawn up by means of nuts 17 on bolts 18, as will be readily understood.

In order to move the one rim-end past the other, as is necessary in order to place a tire on the rim or remove one therefrom, a handled tool 20 is provided having two arms 21 and 22, said arms, of which the one is longer than the other, being formed with lateral projections or pins 23 and 24 respectively adapted to pivotally engage the apertures in the lugs 7 and 8 on the rim-ends when the latter are in register with each other, as shown in Fig. 4. The handle of the tool is off-set laterally so as to lie outside of the plane of the rim and thus permit the tool to be conveniently manipulated.

Upon swinging such tool 20 to the right from the position shown in such Fig. 4, the initial effect is to slightly separate the ends of the rim, so as to permit the reversely beveled tongue 10 to escape from the recess 9; thereupon the continued swinging of the tool will bring the left end below the right end, as shown in such figure, and move the same past such right end into the position shown in dotted outline. In this position the longer arm of the tool rests against the under side of the rim and is there held by the resiliency of the rim, so that the latter can be as readily handled in its contracted form as when properly expanded with its ends in register.

When thus contracted, the tire-shoe 25 (Fig. 3) of a deflated tire, may be readily removed or placed on the rim and in the latter case, the rim is again expanded by simply moving the tool in the reverse direction from that just described, viz., from the position shown in dotted outline to that shown in full lines. The result of such expansion is to bring the ends of the rim into accurate register where, owing to the reversely beveled faces of the rim ends and the engaging faces of the plates, such rim will be securely retained by the resiliency of the rim itself. Upon the inflation of the tire the interlocking action of the beveled faces is still more certain and the rim with the inflated tire may be safely handled and carried about.

To place the rim on the wheel-body, it is simply necessary to bring the latter into position where the recesses 13 and 14 are presented to view and thereupon to lower the rim with the lugs 7 and 8 into engagement with such recesses. The opposite portion of the rim may then be swung into place on the felly by a lateral movement. It will be understood, of course, that the apertures in the rim and felly for the valve-stem of the tire will be located close enough to the lugs and recesses just referred to, so that such valve may be inserted through the hole in the felly at the same time that the lugs are dropped into the recesses.

The foregoing construction, while exceedingly simple and relatively inexpensive to manufacture, provides a rim that is not only convenient to operate in placing a tire thereon or in removing one therefrom, but also one that its adapted to resist all ordinary strains and to maintain its ends at all times in accurate alinement, so that chafing of the tire shoe at this point is eliminated and at the same time safety against accident is insured. Moreover, by reason of the complementary bevels on the rim-ends, such bevels being reversely inclined to a radius of the rim, the latter is in effect locked against both expansion and contraction. The outer bevels, which thus lock the rim against expansion, are the more extensive, for the inner bevels (specifically formed on the contracting edges of the plates 5 and 6) have only to lock the rim against contraction while it is being carried about with a spare tire; once in place on the wheel-body, contraction of the rim is of course impossible.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination of a wheel, a transversely split demountable rim therefor having its ends beveled on a plane inclined to the radius of the rim, plates attached to the inner face of said rim near such ends respectively, said plates having abutting edges beveled reversely to such rim ends, and radially inwardly directed lugs on said plates, said lugs having their outer edges beveled and being formed with transverse apertures, the lugs being adapted to coact with the wheel to form a driving connection for said rim.

2. The combination of a wheel, having its outer face recessed, a transversely split demountable rim for said wheel having its ends beveled on a plane inclined to the radius of the rim, plates attached to the inner face of said rim near such ends respectively, said plates having abutting edges beveled reversely to such rim ends, and radially inwardly directed lugs on said plates, said lugs having their outer edges beveled and being formed with transverse apertures, the lugs being adapted to be received in the recess in said wheel to form a driving connection for said rim.

3. The combination of a wheel having elements on its outer face constituting one part of a driving connection, a transplit rim adapted to be demountably secured to said wheel, said rim having beveled ends and plates rigidly attached to the inner face of said rim adjacent such ends forming the complementary part of such driving connection, said plates having abutting edges beveled in part the same and in part reversely to such rim-ends.

4. The combination of a wheel having elements on its outer face constituting one part of a driving connection, a transplit rim adapted to be demountably secured to said wheel, said rim having beveled ends and plates rigidly attached to the inner face of said rim adjacent such ends, the abutting edge of one of said plates being recessed and the opposed edge of the other being formed with a complementary tongue fitting such recess, the edges of such recess and tongue being beveled the same as the rim-ends and the remainder of the abutting edges of said plates being reversely beveled.

5. In a vehicle wheel, the combination of a wheel; a tire-supporting rim adapted to be demountably secured thereon, said rim being transversely split at one point in its circumference and said wheel having elements on its outer face constituting one part of a driving connection between the same and said rim; and two plates respectively rigidly secured to the inner faces of the rim-ends in separable end-to-end abutment and together forming the complementary part of such driving connection, the abutting edge of one of said plates being recessed to a point back of the corresponding rim-end and the opposed edge of the other plate being formed with a complementary tongue fitting such recess, so as to underlie the opposite rim-end and thereby retain the same against relative movement radially inwardly, said tongue at the same time laterally interlocking with said recessed plate, so as to retain said rim-ends in alinement with each other.

6. In a vehicle wheel, the combination with a wheel felly and tire-supporting rim adapted to be demountably secured thereon, said rim being transversely split at one point only in its circumference and said felly having two circumferentially spaced abutments on its outer face constituting one part of a driving connection between said felly and rim; and two plates respectively rigidly secured to the inner faces of the rim in separable end-to-end abutment and adapted, when thus in abutment to fit between the spaced abutments on said felly to form the complementary part of such driving connection, the abutting edge of one such plate being recessed to a point back of the corresponding rim-end and the opposed edge of the other plate being formed with a complementary tongue fitting such recess, so as to underlie the opposite rim-end and thereby retain the same against relative movement radially inwardly, said tongue at the same time laterallv interlocking with said recessed plate, so as to retain said rim-ends in alinement with each other.

Signed by me, this 3 day of March, 1914.

RICHARD S. BRYANT.

Attested by:—
F. R. Wilhelmy,
R. C. Cooley.

Copies of this patent may be obtained for five cents each, by addressing the "Commissioner of Patents, Washington, D. C."